United States Patent [19]

Pawlak et al.

[11] 4,051,107

[45] Sept. 27, 1977

[54] MICROSTRUCTURED HIGH MOLECULAR WEIGHT-LOW VISCOSITY POLYESTER POLYMERS

[75] Inventors: Joseph A. Pawlak, Cheektowaga; Anthony L. Lemper, Amherst; Victor A. Pattison, Clarence Center, all of N.Y.

[73] Assignee: Hooker Chemicals & Plastics Corporation, Niagara Falls, N.Y.

[21] Appl. No.: 542,636

[22] Filed: Jan. 20, 1975

[51] Int. Cl.² .............................................. C08G 63/40
[52] U.S. Cl. .................................. 260/47 C; 260/860
[58] Field of Search ................... 260/75 M, 47 C, 860

[56] References Cited

U.S. PATENT DOCUMENTS

| 3,498,950 | 3/1970 | Shatz et al. | 260/47 C |
| 3,702,838 | 11/1972 | Wilson | 260/47 C |

*Primary Examiner*—V. P. Hoke
*Attorney, Agent, or Firm*—Peter F. Casella; James F. Mudd

[57] ABSTRACT

High molecular weight, linear aromatic polyesters having an ordered microstructure are produced in an improved solution polycondensation process in which the hydroxyl component is added to the acid halide.

13 Claims, No Drawings

MICROSTRUCTURED HIGH MOLECULAR WEIGHT-LOW VISCOSITY POLYESTER POLYMERS

BACKGROUND OF THE INVENTION

High molecular weight linear polyester compositions based on bisphenols have been shown to be useful in the preparation of films and fibers. These compounds, when molded into useful articles using conventional techniques, offer properties superior to those articles molded from other linear polyester compositions.

Bisphenol polyesters can be prepared by three condensation techniques, i.e., melt, homogeneous and interfacial condensation techniques. Melt or bulk polymerization is the simplest method and in this technique the reactants are charged into a vessel and heated. Homogeneous or solution polymerization generally offers a better rate of reaction and temperature control than the melt process since solubility of all reactants in a common solvent permits the reactants to be more thoroughly dispersed and the resulting product is more conveniently handled. In the interfacial method, the reactants are dissolved in solvents which are immiscible with each other and their reaction takes place at the interface of the solvents.

Of the three condensation techniques, homogeneous or solution polymerization is the least often used for two reasons. The first is that the interfacial technique provides all of the advantages of the homogeneous technique and additionally provides means for maintaining the concentration of the reactants in the reaction zone at a constant level. The second reason is that it is difficult to produce high molecular weight polymers by solution polymerization while such high molecular weight products are easily obtained using either the melt or interfacial techniques. Thus, in solution polymerization, the product rarely has an intrinsic viscosity in excess of 0.6 deciliter per gram of polymer when measured in a solution of symmetrical tetrachloroethane at 30° C., and indeed, most polymers produced by this method have intrinsic viscosities of less than about 0.4 dl/g. The intrinsic viscosity is, of course, a measure of the molecular weight of the product and as the molecular weight decreases, the polyesters become more brittle and lose strength. Thus, the molecular weight of the polyesters produced by the solution process are usually not high enough to produce a polyester having good impact strength.

The interfacial technique has several disadvantages. One is the possibility of hydrolysis of some of the diacid chloride and formation of carboxylic acid groups which can then react with more diacid chloride forming anhydride linkages in the growing polymer. Exposure to moisture during processing and/or use can result in hydrolysis of the anhydride linkage which could seriously degrade polymer properties. In a solution method, moisture can be excluded by careful drying of all ingredients and solvents by known methods such as distillation, azeotropic distillation or drying of solids in suitable equipment such as vacuum ovens. Also in a solution polymerization method, if the hydroxyl-containing compound reacts very rapidly with the diacid chloride it may not be necessary to eliminate the very small amount of water that may be present as an impurity. In an interfacial process, large amounts of water are always present and thus the probability of reaction with the dihalide is increased. Another disadvantage of the interfacial process is the low yield per batch of 3%-5% polymer solids while the solution method affords up to 11% polymer solids per batch.

In the solution condensation of a bisphenol and an aromatic dicarboxylic acid halide, it is known to add the dihalide to the bisphenol or glycol or to mix the two reactants followed by addition of a suitable catalyst, and in both instances to initially employ one diol so as to form a prepolymer and thereafter add the second diol. See, e.g., Korshak et al, J.Poly.Sci., A-1, 11, 2209 (1973). The addition of the aromatic dicarboxylic acid halide to the hydroxyl-containing component is standard procedure.

Copending application Ser. No. 542,644, filed of even date herewith, discloses that adding the hydroxyl-containing component to the diacid halide in solution polymerization produces high molecular weight polyesters having a low melt viscosity. This application is based on the finding that following the procedure of the copending application and using certain sequential additions of reactants will produce high molecular weight polyesters having an ordered microstructure and a lower melt viscosity.

Accordingly, it is the object of this invention to provide a new process for the production of novel high molecular weight aromatic polyesters having an ordered microstructure, a low melt viscosity and an improved yield per volume of reactants and solvents by the solution or homogeneous polymerization technique. This and other objects of the invention will become apparent to those skilled in the art from the following detailed description.

SUMMARY OF THE INVENTION

This invention relates to a solution polymerization process for the production of high molecular weight, ordered microstructure, linear aromatic polyesters, and more particularly to a process in which the hydroxyl-containing component is added to the diacid halide in a particular sequence.

DESCRIPTION OF THE PREFERRED EMBODIMENTS

In accordance with the present invention, a solution polymerization process for the production of linear aromatic polyesters is carried out by adding the hydroxyl-containing component to the diacid halide in a particular sequence under polymerization conditions.

The diacid halides which can be used in the process of the invention include oxalyl chloride and diacid halides of the formula

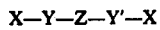

wherein Z is a bivalent or disubstituted radical of 1 to about 20 carbon atoms selected from the group consisting of alkylene, arylene, cycloalkylene, alkylarylene, and arylene-B-arylene where B is —O—, —S—,—SO—, —SO$_2$—, —SO$_3$—, —CO—,

GN<, or alkylene; Y and Y' are independently selected from the group consisting of CO, SO, SO$_2$; and X is halogen. G is defined hereinafter with respect to the bisphenols. Additionally, mixtures of the diacid halides may be employed to achieve a polymer with especially desired properties.

Among aromatic disulfonyl halides which can be used in the polycondensation reaction according to the invention are: 1,4-benzene disulfonyl chloride; 1,3-benzene disulfonyl chloride; 1,2-benzene disulfonyl chloride; 2,7-naphthalene disulfonyl chloride; 4,4'-diphenyl disulfonyl chloride; 4,4'-diphenyloxide disulfonyl chloride; 4,4'-diphenylmethane disulfonyl chloride; 4,4'-diphenylsulfone disulfonyl chloride; 3,3'-diphenylsulfone disulfonyl chloride; bis-(4-chlorosulfonylphenyl)-2,2'-propane; 4,5-dichloro-1,3-benzene disulfonyl chloride; 4,6-dichloro-1,3-benzene disulfonyl chloride; and 4,5,6-trichloro-1,3-benzene disulfonyl chloride.

Among the diacid halides of dicarboxylic acids which can be used according to the invention are: terephthaloyl chloride; isophthaloyl chloride; sebacoyl chloride; adipoyl chloride; 4,4'-diphenylether dicarboxylic acid chloride; fumaryl chloride; and maleoyl chloride.

Diacid halides of aromatic monocarboxysulfonic acids include m-chlorosulfonylbenzoyl chloride; p-chlorosulfonylbenzoyl chloride; and 2-sulfonylchoride-1-naphthyl chloride.

Other typical examples include the acid chlorides of bis(4-carboxyphenyl)-sulfone; bis(4-carboxyphenyl-carbonyl; bis(4-carboxyphenyl)-methane; bis(4-carboxyphenyl)-dichloromethane; 1,2- and 1,1-bis(4-carboxyphenyl)-ethane; 1,1- and 2,2-bis (4-carboxyphenyl)-propane; 1,1- and 2,2-bis(3-carboxyphenyl)-propane; 2,2-bis(4-carboxyphenyl)-1,1-dimethyl-propane; 1,1- and 2,2-bis(4-carboxyphenyl)-butane; 1,1- and 2,2-bis(4-carboxyphenyl)-pentane; 3,3-bis(4-carboxyphenyl)-heptane; 3,3-bis(3-carboxyphenyl)-heptane; and bis(4-carboxy)-diphenyl.

Although the preferred chlorides have been listed above, the other halides, especially the bromides but also the flourides and iodides, may be suitably substituted for the chlorides to obtain good results.

When polymers of the invention having high percentage alternating structure are desired, the acid halide should be one which is capable of transmitting inductive effects. In such an acid halide, when one acid halide group reacts with a diol, the reactivity of the second acid halide group changes. Such acid halides are those of the formula wherein Z is arylene or alkylarylene. Also useful are oxalyl chloride, fumaryl chloride and maleoyl chloride.

The hydroxyl-containing component used in the present invention is a mixture of a bisphenol and a glycol or a mixture of two different bisphenols or a mixture of two different glycols.

The bisphenols considered useful for the preparation of high molecular weight polyesters according to the present invenrion correspond to the general formula:

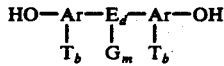

wherein Ar is aromatic, preferably containing 6—18 carbon atoms (including phenyl, biphenyl and naphthyl), G is selected from the group consisting of alkyl, aryl, haloaryl, haloalkylaryl, alkylaryl, cycloalkyl, halocycloalkyl, and haloalkyl, and suitable contains 1—14 carbon atoms; E is a bivalent (or disubstituted) radical selected from the group consisting of alkylene, haloalkylene, cycloalkylene, halocycloalkylene, arylene, haloarylene, —O—, —S—, —SO—, —SO$_2$—, —SO$_3$—, —CO—,

and GN<, and preferably contains 1-14 carbon atoms; T is selected from the group consisting of halogen, G or OG, Cl and Br being preferred halogens; m is 0 to the number of replaceable hydrogen atoms on E; b is 0 to the number of replaceable hydrogen atoms on Ar; and d is 0 or 1. When there is a plurality of G and T substituents in the bisphenols according to the above formula, these substituents may be the same or different. The T substituents may occur in the ortho-, meta-, or para-position with respect to the hydroxyl radical. Additionally, mixtures of the above described bisphenols may be employed to achieve a polymer with especially desired properties. The bisphenols can contain 12 to about 30 carbon atoms, preferably 12 to about 25 carbon atoms.

Bisphenols having the above general formula and which are suitable for being applied according to the present invention include, but are not limited to, bis(4-hydroxyphenyl)-methane, bis(3-methyl-4-hydroxyphenyl)-methane, bis(4-hydroxy-3,5-dichlorophenyl)-methane, bis(4-hydroxy-3,5-dibromophenyl)-methane, bis(4-hydroxy-3,5-difluorophenyl)-methane, bis(4-hydroxyphenyl)-2,2-propane [common name - bisphenol-A], bis(3-chloro-4-hydroxyphenyl)-2,2-propane, bis(4-hydroxy-3,5-dichlorophenyl)-2,2-propane, bis(4-hydroxynaphthyl)-2,2-propane, bis(4-hydroxyphenyl)-phenylmethane, bis(4-hydroxyphenyl)-diphenylmethane, bis(4-hydroxyphenyl)-4'-chlorophenylmethane, bis(4-hydroxyphenyl)-2,2,2-trichloro-1,2-ethane, bis(4-hydroxyphenyl)-1,1-cyclohexane, bis(4-hydroxyphenyl)-cyclohexylmethane, 4,4'-dihydroxydiphenyl, 2,2'-dihydroxydiphenyl, dihydroxynaphthalene, bis(4-hydroxyphenyl)-2,2-butane, bis(3,5-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-tertbutylphenyl)-2,2-propane, bis(4-hydroxyphenyl)-1-phenyl-1,1-ethane, 4,4'-dihydroxy-3-methyldiphenyl-2,2-propane, 4,4'-dihydroxy-3-methyl-3'-isopropyldiphenyl-2,2-butane, bis(3,5-dibromo-4-hydroxyphenyl)-phenyl phosphine oxide, bis(4-hydroxyphenyl)-sulfoxide, bis(4-hydroxyphenyl)-sulfone, bis(4-hydroxyphenyl)-sulfonate, bis(4-hydroxyphenyl)-sulfide, bis(4-hydroxyphenyl)-methylamine, 2,3,5,6,2',3',5',6'-octachloro-4,4'-hydroxybiphenyl, bis(3,5-dibromo-4-hydroxphenyl)-ketone, and bis(3,5-dibromo-4-hydroxyphenyl)-2,2-propane.

In addition to the above recited para hydroxy bisphenols, the corresponding ortho and meta hydroxy bisphenols can be employed in the process of this invention.

The bisphenols and glycols can be employed in proportions from 0 to 100 percent of either, as long as two different compounds are employed. The glycol is preferably employed in any amount from 5 up to about 95 mol percent of the hydroxyl-containing component with the bisphenol constituting the balance. More preferably, the diol is 15-85 mol percent of the hydroxyl-containing component and most preferably about 50 mol percent. In general, the glycols will contain 2-40 carbon atoms and typical examples include ethylene glycol, diethylene glycol, triethylene glycol, tetraethylene glycol, propylene glycol, dipropylene glycol, polypropylene glycol, hexylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, 1,4-butanediol, 1,3-butylene glycol, neopentyll glycol, 1,2-dimethyl-1,2-cyclopentanediol, 1,2-cyclohexanediol, 1,2-dimethyl-1,2-cyclohexanediol, 2,2,4-trimethyl-1,3-pentanediol, polyethylene glycol, hydroxyl-terminated aliphatic polyesters of, e.g., about 1000 molecular weight, and the like.

In accordance with conventional procedure, any of those materials which are known to be catalysts for the condensation reaction can be employed in this invention. Such catalysts are bases, such as tertiary amines such as trimethylamine, triethylamine, pyridine and the like. The base catalyzes the reaction and also neutralizes the hydrogen chloride that would otherwise be liberated during the condensation reaction. The catalyst (and HCl acceptor) is usually employed in twice the molar quantity of the diacid halide although a slight excess of up to about 15 molar percent, preferably 5-10 molar percent, is generally employed to ensure completeness of reaction and to compensate for any loss of volatile base.

Any of the known inert organic solvents can be used in the process of this invention. Suitable inert solvents include both aliphatic and aromatic hydrocarbons as well as simple and cyclic ethers. Typical hydrocarbons include isooctane and benzene fractions such as those having a boiling range of 120°-200° C. Cycloaliphatic compounds such as decahydronaphthalene are also suitable. Benzene, toluene, xylene, and isomeric mixtures of hexylcumene, cyclohexyltoluene, cyclohexylethyl benzene, isopropylethyl benzene, dihexyl benzenes, and diphenyl, and the like are examples of suitable aromatic hydrocarbons. The ethers include diisopropylether, diisoamylether, dimethylethers of ethylene and diethylene glycol, diphenylether, 1,4-dioxane, and the like. Also suitable are nitrobenzene, dimethyl sulfoxide and dimethyl formamide as well as chlorinated aliphatic and aromatic hydrocarbons such as methylene chloride, tetrachloroethane, tetrachloroethylene, pentachloroethane, o-dichlorobenzene, trichlorobenzene, $\beta,\beta$-dichloroethyl benzene, monochlorobenzene, and the like. The amount of solvent must be sufficient to avoid precipitation as the reaction proceeds. The diacid halide is employed in the form of a 1-25 weight percent solution, preferably 10-25 weight percent, in one of the foregoing solvents, although a more concentrated solution can be used if additional solvent is added as the reaction continues. The hydroxyl-containing component can be employed in the form of about a 5-100 weight percent solution (i.e., if the hydroxyl component is a liquid, it can be employed without solvent) and is preferably used as a 30-50 weight percent solution. Sufficient solvent is used to obtain a polyester concentration of 1-11% or more, depending on viscosity, and preferably about 5-10%.

The polymerization process is carried out using the standard solution polymerization techniques except that the hydroxyl-containing component together with the catalyst are added to the diacid halide, preferably with stirring. The addition is preferably performed slowly but this is not necessary if the heat of the exotherm is controlled by cooling via ice baths or solvent reflux. The particular temperatures maintained will depend on the diacid halide. For example, in the case of isophthaloyl chloride, a temperature of 0°-5° C. is suitable while with terephthaloyl chloride a temperature above 15° C. is used in order to maintain the terephthaloyl chloride in solution. In general, the reaction temperature will be from about 0° C. to the boiling point of the most volatile reaction component, and preferably about 0°-40° C. After the end of the addition period, which can last about 0.5-6 hours, preferably about 2-4 hours, a reaction or stirring period is preferably employed, usually lasting about 2-24 hours, depending on the reactivity of the hydroxyl-containing component with the diacid halide. The faster the reaction occurs, the less stirring or reaction time is necessary to ensure completeness of reaction. A second or third addition of a hydroxyl-containing component can then be made in the same manner until all of the diacid halide has reacted with stoichiometric amounts of the hydroxyl-containing components. Thereafter any amine hydrohalide solids can be filtered out of the solution, or the solution can be quenched with dilute hydrochloric acid, washed with distilled water until the washings are free of chloride and filtered. The polymer can then be recovered by the addition of an anti-solvent such as acetone, by addition of the polymer solution to a non-solvent or by addition of the polymer solution to warm or hot water under high agitation in cases where the solvent has a boiling point below that of water.

The color of the composition of this invention is improved by excluding oxygen from the reaction vessel. Phenols and bisphenols upon slight oxidation discolor to a deep red. Since pronounced colors are hard to mask, the polymer to be most useful should be colorless or nearly colorless. Therefore, an inert or unreactive gas is employed to exclude oxygen from the reaction vessel. While it has been convenient to use nitrogen, suitable unreactive gases or mixtures can be employed including the inert gases such as argon, helium and neon.

The process of this invention produces high molecular weight polymers with low melt viscosities which make the polymers suitable for use as engineering plastics, e.g., in the preparation of films and fibers and molded articles. Without being limited to theory, we believe high molecular weight polymers with ordered microstructures are formed for several reasons. The addition of the hydroxyl-containing component to an excess diacid halide prevents the formation of highly crystalline and insoluble block polymers. Furthermore, the addition of the hydroxyl-containing component in a sequential manner influences the formation of definite microstructured linear polymers. In the case of diacid halides, such as terephthaloyl chloride, the two acid halides are of unequal reactivity (see Korshak et al, supra) further adding to the ordering of the microstructure of the resulting polymers.

The following Examples are presented in order to further illustrate the present invention. In the Examples, as well as throughout the specification and claims, all parts and percentages are by weight, all temperatures in degrees Centigrade, and all intrisic viscosities were determined in 1,1,2,2-tetrachloroethane at 30° C. unless otherwise specified.

EXAMPLE 1

A poly(neopentylene-4,4'-isopropylidene diphenylene terephthalate 50:50) was prepared by the process of the copending application Ser. No. 542,644. A solution of distilled terephthaloyl chloride (0.40 mol) in distilled methylene chloride (195 ml) was prepared in a 3-liter 3-necked flask equipped with a mechanical stirrer, thermometer, reflux condenser with attached drying tube, an inert gas inlet and a pressure equalized additional funnel. The flask was immersed in an ice bath but the temperature was maintained above 15° C. to prevent the precipitation of the terephthaloyl chloride. The solution was kept under a constant dry nitrogen atmosphere with stirring. A solution of recrystallized bisphenol-A (0.20 mol), recrystallized neopentyl glycol (0.20 mol) and distilled triethylamine (0.88 mol) in distilled methylene chloride (500 ml) was added to the terephthaloyl chloride solution over a 6.5 hour period at a temperature range of 15°–21.5° C. while maintaining a medium rate of stirring. The addition funnel was rinsed with methylene chloride (200 ml). The reaction mixture was stirred for an additional 2 hour period at temperatures of 18°–23° C. The mixture was filtered to remove triethylamine hydrochloride. Methylene chloride (400 ml) was used for rinsing. The solution was washed with distilled water until the washings were free of chloride ions, treated with activated carbon, dried over $MgSO_4$ and filtered. The solid polymer was recovered by precipitation by addition of acetone as a non-solvent. The solids were dried in a vacuum desiccator at 91°–100° C. The properties of this polymer are given in Table I.

EXAMPLE 2

A poly(neopentylene-4,4'-isopropylidene diphenylene terephthalate 50:50) was prepared by the process of this invention by adding a solution of 78.1 g (0.75 mol) of recrystallized neopentyl glycol and 151.8 g (1.5 mols) of dried and distilled triethylamine dissolved in 200 ml of dried and distilled methylene chloride to a solution of 304.5 g (1.50 mols) of distilled terephthaloyl chloride dissolved in 700 ml of dried and distilled methylene chloride in a 5-liter 3-necked Morton flask which was equipped in the manner described in Example 1. The addition was conducted over a 4 hour period with stirring at temperatures of 19°–25° C. The addition funnel was rinsed with 200 ml of dried and distilled methylene chloride and the reaction mixture stirred for 4 hours at temperatures of 21.8°–24° C. The mixture was allowed to react for an additional 20 hour period at room temperature without stirring. A solution of 171.2 g (0.75 mol) of recrystallized bisphenol-A and 151.8 g (1.50 mols) of dried and distilled triethylamine in 600 ml of dried and distilled methylene chloride was added to the reaction mixture with stirring over a 6.1 hour period at temperatures of 18°–26° C. Thereafter, 5.1 g (0.05 mol) of dried and distilled triethylamine dissolved in 100 ml of dried and distilled methylene chloride were added to ensure complete reaction with an additional 700 ml of methylene chloride was added to the viscous reaction mixture to yield a solution calculated to have 10.9% polymer solids. The solution was washed twice with 1500 ml and twice with 1000 ml of distilled water. After the last washing, the solution formed an emulsion which was precipitated by addition to hot distilled water in a Waring blender. The precipitated polymer was washed three times with distilled water in the Waring blender to remove all traces of chloride ions. The properties of the polymer are set forth in Table I.

TABLE I

| Properties of Solution Polymerized Polyesters | | |
|---|---|---|
| Product of Example | 1 | 2 |
| Type Addition | One Step | Sequential |
| $[\eta]$ (dl/g)[1] | 0.77 at 25° C. | 1.27 at 30° C. |
| $\overline{Mw}^2$ | 38,100 (70,900) | 79,000 (149,000) |
| $\overline{Mn}^2$ | 22,200 (38,500) | 42,900 (77,100) |
| $\overline{Mw}/\overline{Mn}^2$ | 1.72 (1.84) | 1.84 (1.93) |
| Tg, ° C.[3] | 137 | 137.5 |
| Microstructure (NMR Analysis) | Random | 64.8% Alternating[4] |
| Yield (% of Theory) | 68.4 | 98.0 |
| Melt Viscosity at 300° C. at $[\eta] = 0.70$, Poises | ca. 54,000 | ca. 43,000 |

[1]In sym-tetrachloroethane
[2]Gel permeation chromatography analysis using a polyester calibration curve which was derived from absolute values for molecular weights (light scattering for Mw and membrane osmometry for Mn). Mw is the weight average molecular weight while Mn is number average molecular weight. Values in parenthesis were obtained by using a polystyrene calibration curve for the gel permeation chromatography analysis.
[3]Glass transition temperature by differential scanning calorimetry.
[4]Percentage of

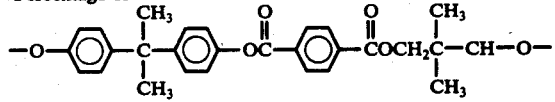

in the microstructure of the polyester determined by NMR. See, Yamadera et al, J.Poly.Sci., A-1, 5, 2259–2268 (1967).

0.5 g samples of each polyester were pressed between aluminum foil on a Carver press for one minute at 180° C. and 8000 psi. The product of Example 2 yielded a film which was predominantly clear while the product of Example 1 showed very little flow as evidenced by a film which was almost completely opaque.

EXAMPLE 3

A poly(neopentylene-4,4'-isopropylidene terephthalate 50:50) prepared by the interfacial process described in United States Patent 3,471,441 and molded was used as a control to compare physical properties of the injection molded product from Example 2. The results are tabulated in Table II.

TABLE II

| Product of | Example 2 | Pat. 3,471,441 |
|---|---|---|
| Tensile, Yield Stength (psi) | 8203 | 8100–8300 |
| Tensile, Ultimate Strength (psi) | 7513 | 7200 |
| Elongation at Yield, % | 10.9 | 7–9 |
| Elongation, Ultimate, % | 94.3 | 29–33 |
| Flexural Strength (psi) | 12,263 | 13,300 |
| Flexural Modulus (psi) | $2.7 \times 10^5$ | $3.2 \times 10^5$ |
| Notched Izod Impact (ft.-lbs/inch) | 14.4 | 11–13 |
| Heat Distortion Temp. ° C | | |
| 66 psi | 129 | 128 |
| 264 psi | 115 | 118 |
| Rockwell Hardness | | |
| R Scale | 118 | 122 |
| M Scale | 40 | 67–75 |
| Abrasion Resistance CS17 Wheels - 1000 g load Mg lost/1000 cycles | 15–16 | 11–13 |

EXAMPLE 4

A poly(neopentylene-4,4'-isopropylidene diphenylene terephthalate 50:50) was prepared by the process of this invention.

3045.5 g (15.00098 mols) of terephthaloyl chloride (commercial grade) were charged into a 10 gallon Pfaudler reactor through the charge port. The port was sealed and 56 pounds (5 gallons) of distilled methylene chloride were charged into the reactor through a solvent charge line. The mixture was stirred at about 21° C. to effect solution. 783.5 g (7.50049 mols) of commercial grade neopentyl glycol (weight adjusted for 0.30% water content) were charged into a melter tank along with one-half gallon of C.P. benzene. The mixture was stirred and heated to reflux using high pressure steam. The benzene was removed continually over a 1 hour period. The neopentyl glycol in the melter tank was cooled and dissolved in 1518 g (15 mols) of distilled triethylamine and 12 pounds (about 1 gallon) of distilled methylene chloride. The resulting solution was added to the Pfaudler reactor via a metering glass and line at 55 ml/minute. Total addition time was 2 hours. Temperature during the addition was maintained at about 22° C. by applying cooling water to the reactor jacket. The reaction mixture was heated to 30°–33° C. for 3 hours and during the heating period, 7.50049 mols (1712.8 g) of Mitsui bisphenol-A (weight corrected for a 0.03% water content) were charged to the melter tank and dehydrated by the same procedure as described above for the neopentyl glycol. The dehydrated bisphenol-A was then dissolved (with heating) in the melter tank in 1669.6 g (16.5 mols) of distilled triethylamine and 12 pounds of distilled methylene chloride. The resulting solution was added to the reactor at a rate of 63 ml/minute (2¼ hour addition period) at 26°–30° C. The melter tank was rinsed with approximately 1 gallon of distilled methylene chloride. The reaction mixture was stirred for 9 hours.

A sample of the polymer solution was neutralized with dilute hydrochloric acid, the water layer removed and the polymer recovered by precipitation in hot distilled water in a Waring blender. After washing with distilled water to remove chloride ions and drying in a vacuum oven, a product was obtained which exhibited an intrinsic viscosity of 0.83 dl/g.

EXAMPLES 5–6

Two poly(neopentylene-4,4'-isopropylidene diphenylene terephthalate 50:50) were prepared by the process described in Example 4. The reaction times and results are set forth in Table III.

TABLE III

| | Sequentially Polymerized Polyesters* | |
|---|---|---|
| Example | 5 | 6 |
| Neopentyl Glycol | | |
|   Addition Time | 2¼ hours | 2¼ hours |
|   Rx Time | 3¼ hours | 14¼ hours |
| Bisphenol-A | | |
|   Addition Time | 3¼ hours | 2¼ hours |
| [η] | 0.70 | 1.08 |
| % Alternating Structure | 72.5 | 68.0 |
| Molecular Weights By GPC | | |
|   Mw | 35,400 (65,600) | 62,800 (117,000) |
|   Mn | 14,300 (23,400) | 17,100 (30,900) |
|   Mw/Mn | 2.48 (2.80) | 3.66 (3.79) |
| Melt Viscosity at 300° C. | | |
| at [η] = 0.70, Poises | — | ca. 43,000 |

*See footnotes to Table I

EXAMPLE 7

302.5 g (1.4900 mols) of commercial terephthaloyl chloride and 2500 ml of dried and distilled methylene chloride were charged into a 5-liter 3-necked Morton flask. The flask was equipped with two Y adapters, a thermometer, a 5-bulb Allihn condenser, a mechanical stirrer, a nitrogen inlet and a steam jacketed 1-liter 3-necked addition flask. The steam jacketed addition flask was equipped with a nitrogen inlet, mechanical stirrer, Dean-Stark trap and a water cooled condenser. 77.76 g (0.74500 mol) of commercial neopentyl glycol (weight corrected for presence of 0.22% water) and 100 ml of dry benzene were charged into the steam jacketed addition flask. The contents were heated with steam to reflux and the mixture refluxed until the water was removed by azeotropic distillation. The benzene was then distilled off, the contents of the flask cooled slightly and 150.8 g (1.49 mols) of dried and distilled triethylamine and 50 ml of dried and distilled methylene chloride were added through a dry water cooled condenser. The mixture was stirred until solution was effected. The neopentyl glycol/triethylamine/methylene chloride solution was added to the terephthaloyl chloride solution over a 2.3 hour period at 15.5°–26° C. The addition flask was rinsed by refluxing 100 ml of dried and distilled methylene chloride. The rinse was added to the reaction mixture which was stirred for 6.7 hours and allowed to react without stirring for 11¼ hours. A solution of 81.31 g (0.37250 mol) of commercial bisphenol-A (weight adjusted to correct for 0.03% water), 84.35 g (0.36935 mol) of commercial thiodiphenol, 0.9449 g (0.00629 mol) of 4-tert-butylphenol and 165.8 g (1.639 mols) of dried and distilled triethylamine in 225 ml of dried and distilled methylene chloride was added to the reaction mixture over a 175 minute period at 20°–24° C. The reaction mixture was stirred for 2½ hours. 1000 ml of distilled water containing 18.7 ml of concentrated hydrochloric acid were then added to the reaction mixture. The water was separated and approximately 500 ml of methylene chloride added to reduce viscosity. The solid polymer was recovered by precipitation into hot distilled water in a Waring blender, washed free of chloride ion with distilled water and dried in a vacuum oven overnight at about 112° C. The final terpolymer was found to have an intrinsic viscosity of 0.70 dl/g in sym-tetrachloroethane at 30° C. and a glass transition temperature of 126° C. (by differential scanning (calorimetry).

EXAMPLE 8

203.0 g (1.000 mol) of commercial terephthaloyl chloride was reacted first with 31.84 g (0.300 mol) of 2,2'-oxydiethanol and 60.7 g (0.60 mol) of distilled triethylamine followed by reaction with 159.36 g (0.69791 mol) of commercial bisphenol-A (weight adjusted for a moisture content of 0.015%), 0.6279 g (0.00418 mol) of 4-tert-butylphenol and 151.8 g (1.50 mols) of distilled triethylamine by the procedure of Example 7. The final polyester exhibited an intrinsic viscosity of 0.79 dl/g in symtetrachloroethane at 30° C. and a glass transition temperature of 135° C. (by differential scanning calorimetry).

EXAMPLE 9

211.7 g (1.0430 mols) of commercial terephthaloyl chloride and 90.8 g (0.4470 mol) of isophthaloyl chloride were reacted by the procedure of Example 7 first with 77.72 g (0.7450 mol) of commercial neopentyl glycol (weight adjusted for a moisture content of 0.164%) and 150.8 g (1.490 mols) of distilled triethylamine followed by reaction with 169.40 g (0.74189 mol) of commercial bisphenol-A (weight adjusted for moisture content of 0.015%), 0.9359 g (0.00623 mol) of 4-tert-butylphenol and 165.8 g (1.639 mols) of distilled triethylamine. The final product exhibited an intrinsic viscosity of 0.64 dl/g in sym-tetrachloroethane at 30° C. and a glass transition temperature of 123° C. (by differential scanning calorimetry).

EXAMPLE 10

3066.4 g (15.104 mols) of commercial terephthaloyl chloride dissolved in 56 pounds of dry methylene chloride was reacted by the procedure of Example 4, using triethylamine as catalyst, with 788.3 g (7.552 mols) of commercial neopentyl glycol (weight adjusted for 0.22% water content — water was removed by azeotropic distillation) followed by reaction with 1718.2 g (7.5239 mols) of commercial bisphenol-A (weight adjusted for a 0.03% water content — water removed by azeotropic distillation) and 8.4379 g of 4-tert-butylphenol. After work-up, a polymer was obtained which exhibited in intrinsic viscosity of 0.83 dl/g in sym-tetrachloroethane at 30° C., a glass transition (DSC) of 138° C. and NMR analysis indicated that the polyester contained about 69.5% of alternating microstructure. A sample of the polyester when injection molded showed a Notched Izod Impact of from 14.7 to 15.4 ft. lbs./inch.

The novel polyesters prepared according to this invention are characterized by having an intrinsic viscosity of at least 0.6 dl/g in symmetrical tetrachloroethane at 30° C, preferably at least about 0.7 dl/g. The polyesters also have a relatively high degree of alternating structure compared to polyesters made by processes that produce products having a random structure. In the working examples provided herein, the amount of alternating structure is expressed as a percentage determined by NMR (See footnote 4 in Table 1). The extent or degree of alternating structure has been expressed in the literature (See Yamadera et al, J. Poly. Sci., A-1, 5, 2259-2268 (1967), as a B value for polymers produced from a 50:50 mixture of two different hydroxyl components (such as 0.5 mole fraction of bisphenol A and 0.5 mole fraction of ethylene glycol). The B value is two times the percent alternating structure divided by 100. (Thus, the B value for the polymer of Example 2 herein is 1.296.) The degree of alternating structure irrespective of the mole fractions of the hydroxyl containing component can be expressed as an Alternation Index (A) which is defined as follows:

$$A = 1 + \left( \frac{b_f - b_r}{b_m - b_r} \right)$$

wherein $b_f$ is the mole fraction of alternating copolymer structure found in the polymer by NMR.

$b_r$ is the mole fraction of alternating copolymer structure that would be produced by a reaction that produces random structure.

$b_m$ is the maximum mole fraction of alternating copolymer structure that is theoretically possible.

A polymer having all alternating structure has an A value of 2.0; a polymer having all random structure has an A value of 1.0. The polymers produced in the working examples herein had proportions of alternating structures and Alternation Indices or A values as follows:

| Example No. | Percent Alternating Structure | Alternation Index |
|---|---|---|
| 2 | 64.8 | 1.296 |
| 5 | 72.5 | 1.450 |
| 6 | 68.0 | 1.360 |
| 10 | 69.5 | 1.390 |

The novel polymers produced in accordance with this invention have an Alternation Index of about 1.1 to 1.6, preferably about 1.2 to about 1.5.

Various changes and modifications can be made in the process of this invention without departing from the spirit and the scope thereof. For example, and as illustrated in the Examples, by taking advantage of reactivity ratio differences of different monomers (see Vinogradova et al, Vysokimol Soed., pp 457–462 (1972) by, e.g., varying addition order and ratios, not only high molecular weight linear copolyesters but also terpolymers, etc., can be prepared. Accordingly, it will be understood that the various embodiments disclosed herein were for the purpose of further illustrating the invention but were not intended to limit it.

We claim:

1. In the solution polymerization process for the production of linear aromatic polyesters by reacting an organic diacid halide with a hydroxyl-containing component in the presence of a base catalyst, the improvement which comprises adding a hydroxyl-containing component comprising a combination of a bisphenol and 5 to about 95 mol percent of a glycol, to the diacid halide, wherein one member of the combination is added to and reacted with the diacid halide and thereafter a different member of the combination is added and reacted with the diacid halide, and the reaction is conducted at a temperature in the range of 0° C. to 40° C. to produce a polyester having an intrinsic viscosity of at least 0.6 dl/g in sym-tetrachloroethane at 30° C and an alternation index of about 1.1 to 1.6; wherein the diacid halide is terephthaloyl chloride, isophthaloyl chloride or a mixture thereof, the glycol has 2–20 carbon atoms, and the bisphenol has the formula

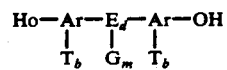

in which Ar is aromatic, each T is independently selected from the group consisting of halogen, G and OG, each G is independently selected from the group consisting of alkyl, aryl, haloaryl, haloalkylaryl, alkylaryl, cycloalkyl, halocycloalkyl, and haloalkyl, E is a bivalent alkylene, haloalkylene, cycloalkylene, halocycloalkylene, arylene, haloarylene, —O—, —S—, —SO—, —SO$_2$—, —SO$_3$—, —CO—,

or GN<, m is 0 to the number of replaceable hydrogen atoms on E, each b is 0 to the number of replaceable hydrogen atoms on Ar, and d is 0 or 1.

2. The process of claim 1 wherein the less reactive of the bisphenol and glycol is initially added to the diacid halide.

3. The process of claim 1 wherein in said bisphenol formula, Ar contains 6–18 carbon atoms, G contains 1–14 carbon atoms, and E contains 1–14 carbon atoms; and wherein said glycol is 15–85 mol percent of the hydroxyl-containing component.

4. The process of claim 1 wherein in said bisphenol formula, Ar is phenyl, E is alkylene, G is alkyl, d is 1, and m is 2.

5. The process of claim 4 wherein said hydroxyl-containing component contains 15–85 mol percent of a glycol.

6. The process of claim 5 wherein the hydroxyl-containing component is bisphenol-A and 15–85 mol percent of a glycol.

7. The process of claim 6 wherein said glycol is neopentyl glycol or ethylene glycol.

8. A high molecular weight, linear aromatic polyester of components comprising an organic diacid halide and a hydroxyl-containing component comprising a combination of a bisphenol and 5 to about 95 mol percent of a glycol, said polyester having an intrinsic viscosity of at least 0.6 dl/g in sym-tetrachloroethane at 30° C. and an alternation index of about 1.1 to 1.6; wherein the diacid halide is terephthaloyl chloride, isophthaloyl chloride or a mixture thereof, the glycol was 2–20 carbon atoms and the bisphenol has the formula

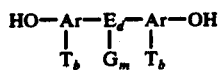

in which Ar is aromatic, each T is independently selected from the group consisting of halogen, G or OG, each G is independently selected from the group consisting of alkyl, aryl, haloaryl, haloalkyaryl, alkylaryl, cycloalkyl, halocycloalkyl, and haloalkyl, E is a bivalent alkylene, haloalkylene, cycloalkylene, halocycloalkylene, arylene, haloarylene, —O—, —S—, —SO—, —SO$_2$—, —SO$_3$—, —CO—,

or GN<, $m$ is 0 to the number of replaceable hydrogen atoms on E, each $b$ is 0 to the number of replaceable hydrogen atoms on Ar, and $d$ is 0 or 1.

9. The polyester of claim 8 having an intrinsic viscosity of at least about 0.7 dl/g in sym-tetrachloroethane at 30° C and an alternation index of about 1.2 to about 1.5.

10. The polyester of claim 9 of ingredients comprising at least one of terephthaloyl chloride and isophthaloyl chloride, and 15–85 mol percent bisphenol-A and 35–15 mol percent of a 2–20 carbon atom glycol.

11. The polyester of claim 10 wherein the glycol is neopentyl glycol.

12. The polyester of claim 10 wherein the glycol is 2,2'-oxydiethanol.

13. The polyester of claim 10 wherein the glycol is neopentyl glycol and 4,4'-thiodiphenol.

* * * * *

UNITED STATES PATENT OFFICE
CERTIFICATE OF CORRECTION

Patent No. 4,051,107　　　　　　　　Dated September 27, 1977

Inventor(s) J. A. Pawlak et al.

It is certified that error appears in the above-identified patent and that said Letters Patent are hereby corrected as shown below:

At Column 14, line 19, for "35-15" read "85-15".

*Signed and Sealed this*

*Fifth* Day of *June 1979*

[SEAL]

Attest:

RUTH C. MASON　　　　　　　　DONALD W. BANNER
*Attesting Officer*　　　　　　　*Commissioner of Patents and Trademarks*